(12) United States Patent
Han et al.

(10) Patent No.: US 8,187,654 B2
(45) Date of Patent: May 29, 2012

(54) PROCESS FOR PREPARING AGED GARLIC

(75) Inventors: Gyu-Bae Han, Seoul (KR); Inn-Hwan Song, Seoul (KR); Ki-Yeol Eom, Gyeonggi-do (KR)

(73) Assignees: Byong Ha Kim, Oakland, CA (US); Chong Yun Yi, Oakland, CA (US)

( * ) Notice: Subject to any disclaimer, the term of this patent is extended or adjusted under 35 U.S.C. 154(b) by 936 days.

(21) Appl. No.: 11/459,698

(22) Filed: Jul. 25, 2006

(65) Prior Publication Data

US 2007/0031574 A1    Feb. 8, 2007

(30) Foreign Application Priority Data

Aug. 3, 2005    (KR) .................. 10-2005-0071064

(51) Int. Cl.
*A23L 1/212* (2006.01)
(52) U.S. Cl. ......... 426/419; 426/418; 426/615; 426/640
(58) Field of Classification Search .................. None
See application file for complete search history.

(56) References Cited

U.S. PATENT DOCUMENTS

| | | | | |
|---|---|---|---|---|
| 4,874,396 A | * | 10/1989 | McLeod | 44/589 |
| 6,197,354 B1 | * | 3/2001 | Zaboli | 426/241 |
| 6,525,299 B2 | * | 2/2003 | Hannon et al. | 219/436 |
| 7,425,342 B2 | * | 9/2008 | Kannar | 424/754 |
| 2004/0146588 A1 | * | 7/2004 | Marchosky Kogan | 424/754 |

FOREIGN PATENT DOCUMENTS

| | | | |
|---|---|---|---|
| EP | 945072 | * | 9/1999 |
| JP | 2006149325 | * | 6/2006 |
| KR | 1992-003052 | | 4/1992 |
| KR | 1994-0003985 | | 5/1994 |
| KR | 1995-0016575 | | 7/1995 |
| KR | 1995-0023328 | | 8/1995 |
| KR | 1996-0004496 | | 4/1996 |
| KR | 2002-19716 | | 3/2002 |
| KR | 10-0343986 | | 6/2002 |
| KR | 100530386 | * | 11/2005 |
| KR | 100663168 | * | 1/2007 |
| KR | 100738427 | * | 7/2007 |

* cited by examiner

*Primary Examiner* — Lien T. Tran
*Assistant Examiner* — Philip Dubois
(74) *Attorney, Agent, or Firm* — Harness, Dickey & Pierce, P.L.C.; Anthony G. Fussner; Kisuk Lee

(57) ABSTRACT

The invention concerns a method of producing aged garlic in which its antioxidation capability is significantly increased as compared to that of raw garlic which is used as a raw material for producing the aged garlic without reducing the essential effectiveness of garlic, S-arylcysteine that does not exist in raw garlic is generated, and the content of polyphenol is increased. The method of producing aged garlic according to the invention is characterized by comprising the steps of aging raw garlic with hot air at 40 to 90° C. for about 300 hours, naturally drying the resultant garlic for approximately 40 hours and then ageing the garlic with hot air at 20 to 30° C. for 30 to 50 hours again. In the step of aging the garlic with hot air at 40 to 90° C. for 280 to 320 hours, a plurality of pieces of the raw garlic is placed in a steel bin and then the steel bins are put into a container for aging.

13 Claims, No Drawings

PROCESS FOR PREPARING AGED GARLIC

RELATED APPLICATIONS

The present application is based on, and claims priority from, Korea Application Number 10-2005-0071064, filed Aug. 3, 2005, the disclosure of which is hereby incorporated by reference herein in its entirety.

BACKGROUND OF THE INVENTION

1. Technical Field

The invention relates to a method of producing aged garlic, and more particularly to a method of producing aged garlic by putting a plurality of pieces of raw garlic in a steel bin, aging them with hot air at 40 to 90° C. for approximately 300 hours, naturally drying the individual garlic pieces for approximately 40 hours, and then aging them with hot air at 20 to 30° C. for 30 to 50 hours again.

2. Description of the Prior Art

Conventionally, it is known that allicin, one of components of garlic, does the antibacterial action and, in addition, does anti-thormbogenesis and anticancer actions, lowers cholesterol values, slows aging, and does the antioxidation action. Such actions of garlic are made secondarily by actions of enzymes which are degradation products of allicin and exist in garlic, and it is known that the actions are generated by reaction between the enzymes resulting from destroyed garlic cells and stromata. Generation and reaction factors as well as separation of flavor of garlic have not been studied yet so much. It is not easy to take natural raw garlic and its powder without any additives because of its strong stimulating flavor.

Garlic has thus been used as spices for food in most cases, but since such raw garlic (garlic powder) changes its color to blue or brown over time, garlic is usually heated to be powder to prevent blueing or browning. If it is heated, it is difficult to keep its original components and also hard to provide its taste as a spice.

In order to solve such problems, there have been proposed many methods. That is, for example, there have been proposed: A Method of Producing Odorless Concentrated Garlic Extract by putting garlic in water, extracting components at a high temperature, filtering it, and then adding cyclodextrin (Korea patent publication No. 1995-23328); A Method of Producing Bamboosalt-garlic Pills by mixing roasted garlic and bamboosalt (Korea patent publication No. 1995-16575); Facial Soap Containing Extract from Garlic Powder and Water (Korea Patent No:1996-4496); A Method of Producing Garlic Soy Sauce by mixing liquid-phase material obtained by immersing garlic powder in ethanol, with soy sauce (Korea Patent No: 1994-3985); Garlic Spice obtained by mixing concentrate after extracting components from garlic skin with ethanol, with garlic essential oil obtained by extracting components from garlic with organic solvent (Korea Patent No: 1992-3052); A Method of Producing Garlic Drink obtained by boiling garlic and water at the atmospheric pressure and then mixing it with an assistant such as mushrooms, mugworts and the like (Korea Patent No. 10-343986); and Garlic Extract for components used for cosmetic materials (Korea Patent No. 2002-19716).

Those known processed products using garlic can be classified into dried garlic, concentrated extract obtained by means of solvent, garlic juice concentrate, etc. The dried garlic is classified into freeze-dried and hot air-dried garlic. Freeze-dried garlic products can minimize loss of flavor components and browning, and can be stored and distributed for a long time by drying garlic to have a final water content of approximately 30%. However, in the processed garlic products described above, the original effectiveness of garlic may be lost by using additives and there is also a limit in self-aging.

BRIEF SUMMARY OF THE INVENTION

The present invention was devised in order to solve the aforementioned problems. It is an object of the invention to provide a method of producing aged garlic, by self-aging multiple pieces of raw garlic at a constant temperature and humidity without using any additive, wherein antioxidation capability of garlic is significantly increased as compared to the raw garlic used as a raw material to produce the aged garlic, without reducing its intrinsic effectiveness, S-aryl cysteine not existing in raw garlic is generated and the content of polyphenol is increased.

The method of producing aged garlic according to the invention in order to achieve the aforementioned object is characterized in that it comprises the steps of aging raw garlic with hot air at 40 to 90° C. for 280 to 320 hours, naturally drying the resultant garlic for 38 to 42 hours and then aging, again, the resultant garlic with hot air at 20 to 30° C. for 30 to 50 hours.

Also, the method according to the invention is characterized in that the step of aging garlic with hot air at 40 to 90° C. for 280 to 320 hours comprises the steps of: putting a plurality of pieces of raw garlic in a steel bin and then aging the garlic in the plurality of steel bins in a container. The method according to the invention is also characterized in that charcoal is placed on the bottom of the steel bin. Also, the method according to the invention is characterized in that the step of aging the garlic with hot air at 40 to 90° C. for 280 to 320 hours comprises the step of supplying moisture to each steel bin. Also, the method according to the invention is characterized in that the moisture is supplied everyday wherein 4 liters of water is supplied for each 100 kg of garlic, respectively.

BRIEF DESCRIPTION OF THE DRAWINGS none

DETAILED DESCRIPTION OF THE PREFERRED EMBODIMENT

The aged black garlic produced by the method of producing aged garlic according to the invention can be obtained by self-aging at a given temperature and humidity without using any additive as described hereinbelow. Unlike other processed garlic products, the aged black garlic according to the invention is characterized in that it smells natural garlic itself, but doesn't have intrinsic unpleasant smell of garlic coming out of a person's body with his breath after eating garlic. The aged black garlic according to the invention is also characterized in that without reducing original effectiveness of garlic, it has an antioxidation capability 10 times higher than that of raw garlic used as a raw material for producing the aged black garlic. In the aged black garlic according to the invention, S-aril cysteine is generated which is effective for preventing cancer, inhibiting cholesterol, improving arterial sclerosis, preventing heart diseases, preventing alzheimer's disease, etc. The content of polyphenol is significantly increased in the aged black garlic, which is effective for inhibiting oxidation of cholesterol, inhibiting generation of active oxygen and preventing arterial sclerosis.

Hereinafter, a preferred embodiment of the invention will be described in detail.

First, about 50 pieces of raw garlic is put into a typical steel bin. Here, charcoal is placed on the bottom of the steel bin in order to remove the smell. About 250 steel bins having raw garlic therein are moved to a container. An electric hot air heater is operated so that heat is applied uniformly to the entire part of the container. That is, heat is not directly applied and the garlic in the container is kept for aging until the temperature in the whole area of the container reaches approximately 40 to 90° C. If the temperature for aging is lower than 40° C., the garlic may go rotten. If the temperature for aging is kept higher than 90° C., the garlic is not aged and the essential effectiveness of garlic is lost. The garlic is aged for 280 to 320 hours, preferably 300 hours with hot air. In this case, it is necessary to open the cover to check the state and to remove gas everyday. It is preferred to supply 4 liters of water per about 100 kg of garlic, in order to supply moisture on an everyday basis. The purpose of supplementing water is to reduce bad smell in the garlic.

Subsequently, after taking the steel bins out of the container after finishing aging, individual pieces of garlic are dried for 38 to 42 hours, preferably 40 hours, in a different place, not in the container, naturally without applying any heat. In the present invention the time for aging at a high temperature or natural drying is not limited to the specified values, and it can be extended or shortened, as required. Subsequently the garlic is aged again with hot air at 20 to 30° C. for 30 to 50 hours. This process is for improving the taste of the aged garlic (aged black garlic) according to the invention. In case of secondary aging with hot air at a temperature lower than 20° C., it is impossible to remove burning feeling in one's stomach when he eats raw garlic. In case of secondary aging with hot air at a temperature higher than 30° C., it is impossible to efficiently remove the bitter taste of garlic.

As such, the aged garlic is obtained as a food without any additive only by heating for aging.

Of course, the aged garlic obtained as such according to the invention can be used to obtain concentrated garlic extract by filtering it with a juice extractor. The aged garlic according to the invention can be ground with a grinder to make aged black garlic powder as an aged black garlic product.

Test 1

First, as a reagent, a buffer solution of 0.05 M $Na_2CO_3$ (pH 10.2) is prepared. Solve Xanthine 45.64 mg in the above buffer solution to be a resultant solution of 100 ml and thus to make 3 mM Xanthine. Solve EDTA.2Na 111.7 mg in distilled water to be a resultant solution of 100 ml and thus to make 3 mM EDTA. Solve bovine serum albumin 15 mg in distilled water to be 10 ml and thus to make a BSA solution. Put NBT 61.32 mg in distilled water to be a resultant solution of 100 ml and thus to make 0.75 mM NBT. Dilute Xanthine oxidase with distilled water to make Xanthine oxidase so that its absorptivity is within 0.20 to 0.23. Solve $CuCl_2.2H_2O$ 102.29 mg in distilled water to be a resultant solution of 100 ml and thus to make 6 mM $CuCl_2$, Subsequently, in order to prepare standard SOD (Superoxide Dismutase), dilute caffeic acid with distilled water to produce a SOD activated standard solution.

Subsequently, grind 20 g of the black garlic according to the invention, conventional odorless garlic (A), bamboo-garlic (B), dried garlic (C) and raw garlic (D), respectively, with a garlic grinder. The each different garlic is placed with 30% EtOH 200 ml in a 500 ml beaker and then resultant garlic is subject to an extraction process at 80° C. for one hour to obtain a test solution while stirring it with a stirrer. Subsequently, put 2.4 ml of a buffer solution of 0.05 M $Na_2CO_3$ in each test tube and then add 0.1 ml of 3 mM Xanthine, 3 mM EDTA, BSA solution and 0.75 mM NBT, respectively, to each test tube. Add the test material of 0.1 ml containing SOD thereto and initiate incubating at 25° C. After 20 minutes, 6 mM $CuCl_2$ 0.1 ml was added thereto to stop reaction and then SOD activation and the content of polyphenol was measured. The result is shown in the following table 1.

TABLE 1

|  | Aged black garlic | Odorless garlic (A) | Bamboo-garlic (B) | Dried garlic(C) | Raw garlic (D) |
| --- | --- | --- | --- | --- | --- |
| SOD activation (%) | 1.5 | 0.25 | 0.22 | 0.21 | 0.15 |
| Content of polyphenol (%) | 3.25 | 0.21 | 0.30 | 1.15 | 0.17 |

As shown in the above table 1, it is seen that the aged black garlic produced with the method of producing aged garlic according to the invention has a SOD capability 10 times higher than that of raw garlic which is used as a raw material for producing the aged black garlic when measuring SOD activation by means of the Xanthine oxidase method. The content of polyphenol in the aged black garlic according to the invention is 10 times more than that in conventional products. The size of one polyphenol molecule in raw garlic is large but one polyphenol molecule in the aged garlic produced according to the method of the invention is segmented into about 10 pieces as if it seems that a significant amount is relatively increased. Therefore, the black garlic according to the invention has an effect that the polyphenol particles are quickly absorbed in a human body. In the aged garlic produced with the method according to the invention, SAC (Sallylcysteine) is generated that does not exist in raw garlic. This can be proved in that when a person eats the aged garlic produced with the method according to the invention and belches, his breath doesn't have the intrinsic garlic smell. Raw garlic has glutamile SAC component that is oil-soluble, which prevents easy absorption of garlic in a human body and it takes a period of about one day for absorption. Accordingly when a person eats garlic and belches, the intrinsic smell of garlic comes up from his stomach, which spreads unpleasant smell. The aged garlic produced with the method according to the invention, however, didn't produce the intrinsic smell of garlic when belching after taking the aged garlic. It is decided that the glutamile SAC component in raw garlic is transformed to water-soluble SAC, resulting in quick absorption in a human body.

The inventors could see that in the aged garlic produced with the method according to the invention, the change ratio to free amino acid highly usable in a human body by means of natural aging was 1.5 times higher than that in conventional products.

From the foregoing description, it will be observed that various modifications and changes can be made by those skilled in the art without departing from the true sprit and scope of the present invention. It should be understood that the foregoing description is intended to illustrate and not to limit the scope of the invention as defined by the claims.

The invention claimed is:
1. A method for producing aged garlic, comprising
aging raw garlic in a container with air at 40 to 90° C. for 280 to 320 hours by heating the container with an electric air heater;

naturally drying the aged garlic by removing the garlic from the container and drying the garlic without applying heat for 38 to 42 hours; and aging the dried garlic with air at 20 to 30° C. for 30 to 50 hours.

2. The method as claimed in claim 1, wherein aging raw garlic with air at 40 to 90° C. for 280 to 320 hours comprises:

placing a plurality of steel bins with the raw garlic in the container;

aging the garlic in the steel bins; and placing charcoal on the bottom of the steel bins.

3. The method as claimed in claim 2, wherein aging raw garlic with air at 40 to 90° C. for 280 to 320 hours comprises supplying moisture to each steel bin.

4. The method as claimed in claim 3, wherein the moisture is supplied everyday and 4 liters of water per 100 kg of garlic is supplied.

5. The method as claimed in claim 1, wherein aging raw garlic with air at 40 to 90° C. for 280 to 320 hours comprises using charcoal to remove the smell during the aging.

6. The method as claimed in claim 1, wherein aging raw garlic with air at 40 to 90° C. for 280 to 320 hours comprises aging the raw garlic with air at 40 to 90° C. for 300 hours.

7. The method as claimed in claim 1, wherein naturally drying the garlic for 38 to 42 hours comprises naturally drying the garlic for 40 hours.

8. The method as claimed in claim 1, further comprising one of:

filtering the aged garlic with a juice extractor to obtain concentrated garlic extract; or grinding the aged garlic with a grinder to make aged garlic powder.

9. A method for producing aged garlic, comprising:

putting raw garlic in one or more steel bins;

placing charcoal on the bottom of the steel bins;

placing the steel bins in a container;

aging the garlic while in the steel bins within the container at 40 to 90° C. for 280 to 320 hours by heating the container with an electric air heater;

naturally drying the aged garlic by removing the garlic from the container and drying the garlic without applying heat for 38 to 42 hours; and aging the dried garlic with air at 20 to 30° C. for 30 to 50 hours.

10. The method as claimed in claim 9, wherein aging the garlic while in the steel bins within the container at 40 to 90° C. for 280 to 320 hours comprises opening the container daily to remove gas.

11. The method as claimed in claim 9, wherein:

the garlic is aged while in the steel bins within the container at 40 to 90° C. for 300 hours; and the garlic is naturally dried for 40 hours.

12. The method as claimed in claim 9, wherein aging the garlic while in the steel bins within the container at 40 to 90° C. for 280 to 320 hours comprises supplying moisture to the steel bins.

13. The method as claimed in claim 12, wherein the moisture is supplied everyday and 4 liters of water per 100 kg of garlic is supplied.

* * * * *